United States Patent

Pedersen

[15] 3,670,964
[45] June 20, 1972

[54] JET NOZZLE
[72] Inventor: George H. Pedersen, Indianapolis, Ind.
[73] Assignee: General Motors Corporation, Detroit, Mich.
[22] Filed: Jan. 18, 1971
[21] Appl. No.: 107,081

[52] U.S. Cl..........................239/265.19, 60/244, 239/265.33
[51] Int. Cl...........................................................B63h 11/10
[58] Field of Search....................239/265.19, 265.25, 265.27, 239/265.33, 265.37, 265.39, 265.41, 265.11, 265.29, 265.31; 60/244

[56] References Cited

UNITED STATES PATENTS

| | | |
|---|---|---|
| 2,955,414 | 10/1960 | Hausmann................................60/244 |
| 3,192,712 | 7/1965 | Nash et al................................60/244 |
| 3,324,660 | 6/1967 | Lane et al................................60/244 |
| 3,347,467 | 10/1967 | Carl et al. ......................239/265.37 X |

Primary Examiner—Allen N. Knowles
Assistant Examiner—Edwin D. Grant
Attorney—Jean L. Carpenter and Arthur N. Krein

[57] ABSTRACT

A jet nozzle for a turbofan-ramjet type engine in which leaves in the termination of the boundary between a fan duct and a turbine outlet duct are movable between an outer wall and a tailcone to throttle or close either duct, the outer wall further including an axially shiftable shroud to vary the discharge outlet area between it and the tailcone.

4 Claims, 2 Drawing Figures

PATENTED JUN 20 1972 3,670,964
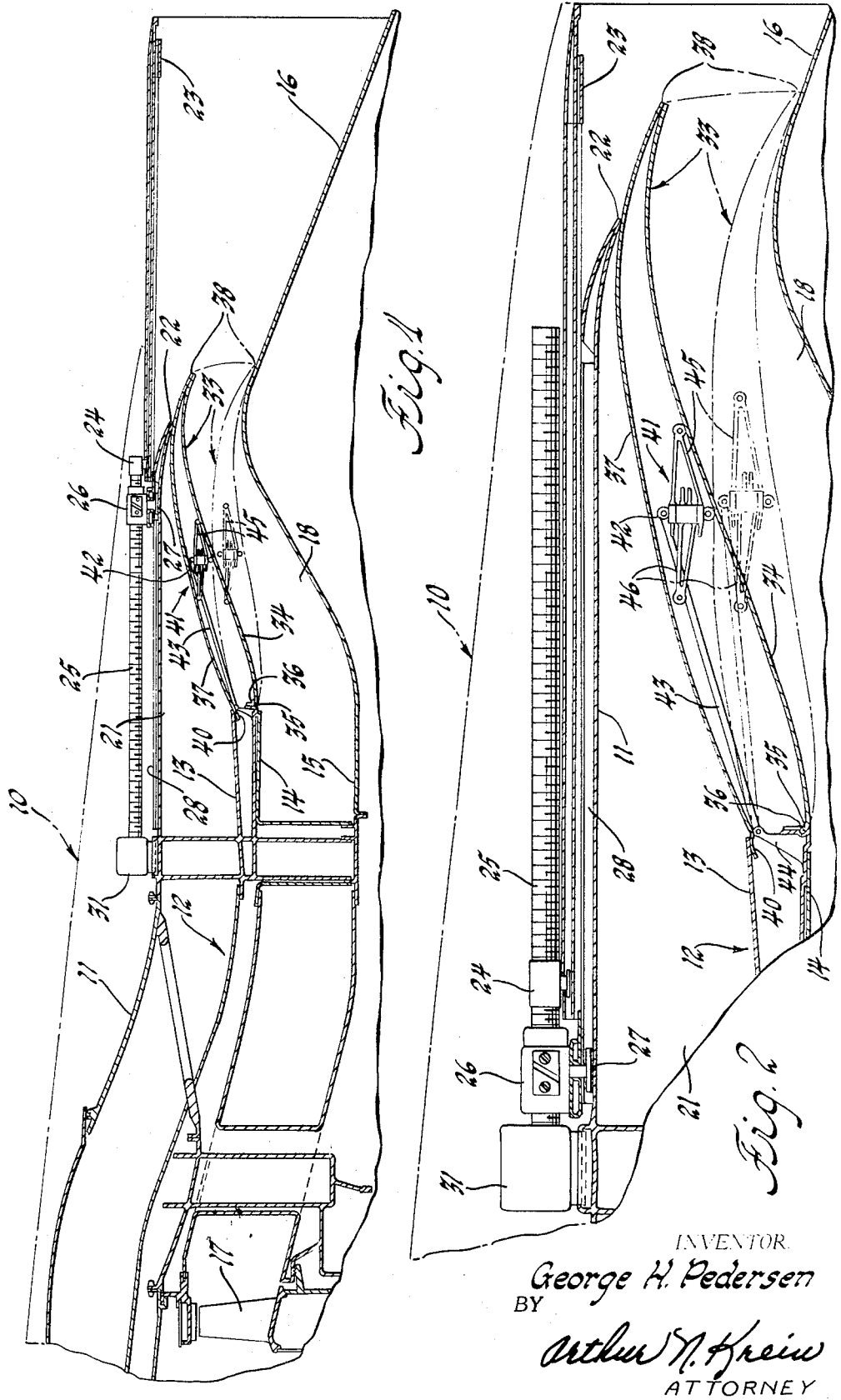
INVENTOR.
George H. Pedersen
BY
Arthur N. Krein
ATTORNEY

JET NOZZLE

This invention relates to jet propulsion engines and, specifically, to a jet nozzle arrangement for a turbofan-ramjet type engine to permit efficient operation of the engine as a turbojet only, as a ramjet only or as a combination of these two modes of engine operation.

Because of the variations in the so-called mission requirements of an aircraft, it is often desirous to use a form of jet propulsion engine, commonly referred to as a turbofanramjet engine, which is adapted to operate as a ducted fan gas turbine jet engine at low forward speeds and, essentially, as a ramjet engine at relatively high forward speeds. In effect, this type engine comprises at least two propulsion engines suitable for operation respectively at progressively higher ranges of flight speeds. The exhaust of each engine is discharged through a nozzle which requires adjustment to suit the various expansion ratios if good efficiency is to be obtained.

It is, therefore, an object of this invention to provide a jet nozzle for a turbofan-ramjet engine whereby the outlet section of the exhaust nozzle can be varied to suit the varying expansion ratios when the engine is operated as a turbofan engine, ramjet engine or both.

Another object of this invention is to provide a common jet nozzle for a multimission engine wherein discharge from either a fan duct and turbine outlet duct can be controlled by a valve structure and wherein the outlet area of a common discharge outlet over a tailcone is varied by means of an axially movable shroud encircling the tailcone.

These and other objects of the invention are attained in a plug-type exhaust nozzle having a translating outer cylinder which can be moved to an optimum position depending on the overall nozzle pressure ratio and in which leaves at the termination of the boundary between a fan duct and a turbine outlet duct are movable between an outer wall and the tailcone to throttle or close either duct.

For a better understanding of the invention, as well as other objects and further features thereof, reference is had to the following detailed description of the invention to be read in connection with the accompanying drawings, wherein:

FIG. 1 is a sectional view of a portion of the exhaust end of a turbofan-ramjet aircraft engine constructed in accordance with the invention, the movable shroud thereof being shown in a fully extended aft position; and, FIG. 2 is an enlarged view of a portion of the structure illustrated in FIG. 1 showing the outer shroud in a fully retracted or fore position.

FIG. 1 illustrates a portion of the turbofan-ramjet engine downstream of the turbine and fan, with means for controlling the exhaust from the fan duct and from the gas turbine through a plug-type exhaust nozzle.

The engine, mounted in an engine housing 10, includes an outer wall or casing 11, an intermediate wall or casing 12, which specifically is illustrated as double-walled, comprising two mutually adjacent walls 13 and 14, and an inner wall 15 which specifically includes a converging-diverging, spherically ended bullet or tailcone 16 which is mounted symmetrically about the axis of the engine downstream of the turbine, only a blade 17 of the low pressure turbine being illustrated in this figure, since other details of the engine structure are not pertinent to the subject engine. Walls 14 and 15 define between them a duct 18 which is the exhaust duct from the turbine. Walls 11 and 13 define between them a duct 21 which is the fan duct of the engine.

The outer wall 11 terminates in a fixed circular outlet end 22 and, in accordance with the invention, in an end defined by an axially movable annular shroud 23 mounted on the exterior of the outer wall or casing 11.

The shroud 23, which may be formed as segments suitably secured together, may be supported and moved relative to the outer wall or casing 11 in any suitable manner such as by hydraulic rams or reversible motor, as shown. In the embodiment illustrated, the shroud 23 is supported about casing 11 as by means of a plurality of bearings 24 equally spaced about and fixed thereto. Each of the bearings 24 is slideably positioned on a similarly positioned screw rod 25. In addition, the shroud 23 is further supported and moved axially fore and aft by a plurality of recirculating ball-type nut members 26 fixed to the fore end of the shroud and positioned to encircle and engage the screw rod 25 with which it is associated. Each of the screw rods 25 is driven by a suitable reversible motor 31. As shown, each of the nut members 26 is provided with a depending roller portion 27 guided in a guide channel 28 fixed to the outer casing 11. Rotation of the screw rods 25 by the motors 31 initiates travel of the nut members 26 to position the shroud fore and aft as desired. With this arrangement, the shroud may be positioned axially fore and aft as desired to effect the optimum pressure ratio position depending on the overall nozzle pressure ratio, that is, the discharge pressure from the engine relative to ambient air pressure.

The intermediate wall 12 terminates at 32 upstream of the end 22 of the outer casing and pivotally supports, in a manner to be described, a valve member which serves in cooperation with the inner wall and the outer housing to form the proper nozzle for each flow path as represented by ducts 18 and 21 and, in addition, serves as a valve to prevent reverse flow of hot gases through either flow path when operating conditions are such that only one portion is operative or producing thrust.

This valve member may take the form of a variable valve ring or nozzle ring made up of a ring of master leaves or flaps 33, each flap having an inner wall 34, the forward end of which terminates in a hinge pin 35 which can rotate to a small extent in a socket 36 extending tangential to the outlet end of the duct 18. Each flap 33 also includes an outer wall 37 spaced from the inner wall 34 except at the downstream end 38. The inner wall 34 is aligned with wall 14 and the outer wall 37 with wall 13 of the intermediate wall 12. Walls 37 comprise an arcuate forward end 40 which is in sliding contact with the downstream end of wall 13. The ring of flaps 33 may move from the outermost position indicated in solid lines in FIGS. 1 and 2 in which the wall 37 abuts the nozzle end 22 to an innermost position, shown in broken lines in these figures, in which the tip of the flap is in contact with the bullet or tailcone 16.

The flaps 33 may be mechanically adjusted or, as shown, they can be mounted by means of a synchronizing or regulating linkage, generally designated 41, which may be of the type disclosed in copending United States patent application Ser. No. 879,111 filed Nov. 24, 1969, in the name of Douglas Johnson (of common ownership with this application), and includes a plurality of pivot members 42, one for each flap segment 33 which is pivotally secured at one end to the inner wall 34 of its associated flap and at its other end to one end of a link 43, the opposite end of the link 43 being pivotally connected to a bracket 44 fixed to and extending from the wall 14 and thus forming part of intermediate wall 12. Each pivot member 42 mounts two pieces of a lazy tongs linkage, a piece 45 and a piece 46. Each of the pieces 45 and 46 has a universal joint connection, not shown, with the piece 45 or 46, respectively, on each adjoining flap. For a more detailed description of this structure, reference is made to the above-identified United States patent application Ser. No. 879,111. This type linkage permits the flaps 33 to be, in effect, free floating and thereby adapted to assume a position in response to the gas pressures exerted upon the respective faces of the flaps. The flaps 33 are thus positioned by the pressure acting on opposite sides thereof and serve as a valve member in the maximum and minimum position relative to the ducts 18 and 21. The flaps 33 are arranged in a circular array and, slave flaps, not shown, of suitable configuration, may be provided to bridge the gaps between the flaps when they are open in their position at which they are closest together, in a conventional manner.

What is claimed is:

1. A dual flow jet engine comprising a gas turbine disposed in a central duct defined by an inner wall terminating in a tailcone and an intermediate wall, an annular secondary duct defined by said intermediate wall and an outer wall encircling said central duct, an axially movable annular shroud positioned on said outer wall and defining with said tailcone a common discharge nozzle for said central duct and said secondary duct, the outlet area of which is varied by axially moving said shroud, power means connected to said shroud for moving said shroud axially, and flaps movably mounted on the end of said intermediate wall and extending therefrom for movement between said inner wall and said outer wall to throttle or close said central duct and said secondary duct.

2. A dual flow jet engine according to claim 1 wherein said flaps are free floating and movable in accordance with the jet forces acting on opposite sides of the said flaps.

3. A dual flow jet engine according to claim 1 wherein said power means includes a plurality of power rotatable screw rods operatively connected to said outer wall and a plurality of recirculating ball-type nut members positioned on said shroud with each of said recirculating ball-type nut members encircling one of said power rotatable screw rods.

4. A jet propulsion engine nozzle including a convergent-divergent passage provided by a central inner annular wall terminating in a tailcone and a spaced apart annular outer wall means including an outer wall and an annular shroud positioned for axial movement on said outer wall, an intermediate wall positioned between said central inner wall and said outer wall and terminating upstream from the end of said outer wall, said central inner wall and said intermediate wall defining a central duct, said intermediate wall and said outer wall defining a secondary duct, flap means movably mounted on the end of said intermediate wall and extending therefrom for movement between said inner wall and said outer wall to regulate flow through said central duct and said secondary duct, and power means connected to said shroud for moving said shroud axially to vary the engine nozzle discharge area.

* * * * *